United States Patent
Ben-Ami et al.

(10) Patent No.: US 10,187,719 B2
(45) Date of Patent: Jan. 22, 2019

(54) METHODS AND DEVICES FOR OPERATING AN AUDIO PROCESSING INTEGRATED CIRCUIT TO RECORD AN AUDIO SIGNAL VIA A HEADPHONE PORT

(71) Applicant: Bugatone Ltd., Tel-Aviv (IL)

(72) Inventors: Edmund Ben-Ami, Beer-Shiva (IL); Noam Petrank, Tel Aviv-Yafo (IL)

(73) Assignee: Bugatone Ltd., Tel Aviv (IL)

( * ) Notice: Subject to any disclaimer, the term of this patent is extended or adjusted under 35 U.S.C. 154(b) by 0 days.

(21) Appl. No.: 15/308,052

(22) PCT Filed: Apr. 26, 2015

(86) PCT No.: PCT/IL2015/050430
§ 371 (c)(1),
(2) Date: Oct. 31, 2016

(87) PCT Pub. No.: WO2015/166482
PCT Pub. Date: Nov. 5, 2015

(65) Prior Publication Data
US 2017/0055063 A1    Feb. 23, 2017

Related U.S. Application Data

(60) Provisional application No. 61/986,895, filed on May 1, 2014.

(51) Int. Cl.
*H04R 1/10* (2006.01)
*H04R 3/00* (2006.01)
*G06F 13/00* (2006.01)

(52) U.S. Cl.
CPC ........... *H04R 1/1091* (2013.01); *G06F 13/00* (2013.01); *H04R 1/1041* (2013.01); *H04R 3/00* (2013.01); *H04R 2420/03* (2013.01)

(58) Field of Classification Search
None
See application file for complete search history.

(56) References Cited

U.S. PATENT DOCUMENTS

| | | | |
|---|---|---|---|
| 4,395,739 | A | 7/1983 | Nakazawa et al. |
| 5,787,187 | A | 7/1998 | Bouchard et al. |

(Continued)

FOREIGN PATENT DOCUMENTS

| | | |
|---|---|---|
| CN | 2162063 | 4/1994 |
| EP | 2202998 | 6/2010 |

(Continued)

OTHER PUBLICATIONS

International Search Report and Written Opinion in International Application No. PCT/IL2015/050430, dated Aug. 2, 2015, 7 pages.

(Continued)

*Primary Examiner* — Curtis Kuntz
*Assistant Examiner* — Qin Zhu
(74) *Attorney, Agent, or Firm* — Fish & Richardson P.C.

(57) ABSTRACT

According to an aspect of some embodiments of the present invention there is provided a method of recording a signal from a headphone. The method may comprise instructing an audio processing integrated circuit of a client terminal to connect an electrical resistance component between an electrical ground of a client terminal and an electrical ground of one or more electro-acoustic output transducer of a headphone. The method may further comprise instructing the audio processing integrated circuit of the client terminal to accept as microphone input a signal from the one or more electro-acoustic output transducer of the headphone. The method may further comprise recording a signal from the one or more electro-acoustic output transducer of the headphone using the audio processing integrated circuit of the client terminal.

16 Claims, 11 Drawing Sheets

(56) References Cited

U.S. PATENT DOCUMENTS

| | | | |
|---|---|---|---|
| 5,907,538 A | 5/1999 | White | |
| 5,990,784 A | 11/1999 | Burnett | |
| 6,385,261 B1 | 5/2002 | Tsuji et al. | |
| 6,487,916 B1 | 12/2002 | Gomm | |
| 7,065,219 B1 | 6/2006 | Abe et al. | |
| 7,359,504 B1 | 4/2008 | Reuss et al. | |
| 7,773,759 B2 | 8/2010 | Alves et al. | |
| 8,249,265 B2 | 8/2012 | Shumard | |
| 8,447,047 B2 * | 5/2013 | Saraoka | G10K 11/178 381/71.6 |
| 8,750,528 B2 | 6/2014 | Dong | |
| 8,774,875 B1 | 7/2014 | Halferty et al. | |
| 9,305,568 B2 | 4/2016 | Kraft et al. | |
| 9,466,281 B2 | 10/2016 | Hoang Co Thuy et al. | |
| 2004/0136543 A1 * | 7/2004 | White | H04R 1/08 381/74 |
| 2004/0215968 A1 | 10/2004 | Rodwell et al. | |
| 2004/0225207 A1 | 11/2004 | Bae et al. | |
| 2006/0013410 A1 * | 1/2006 | Wurtz | H04R 1/1083 381/74 |
| 2007/0049103 A1 * | 3/2007 | Kashi | H01R 24/58 439/396 |
| 2007/0178947 A1 * | 8/2007 | Kim | H04R 1/1041 455/575.2 |
| 2008/0044036 A1 | 2/2008 | Konchitsky | |
| 2008/0146890 A1 | 6/2008 | LeBoeuf | |
| 2008/0159555 A1 | 7/2008 | Asada et al. | |
| 2008/0164994 A1 * | 7/2008 | Johnson | H01R 13/703 340/533 |
| 2009/0003617 A1 | 1/2009 | Goldman | |
| 2009/0105548 A1 | 4/2009 | Bart | |
| 2009/0245529 A1 | 10/2009 | Asada et al. | |
| 2010/0105447 A1 | 4/2010 | Sibbald et al. | |
| 2010/0125218 A1 | 5/2010 | Haartsen | |
| 2010/0145203 A1 | 6/2010 | Kim et al. | |
| 2010/0174390 A1 | 7/2010 | Garrett et al. | |
| 2010/0195842 A1 | 8/2010 | Sibbald et al. | |
| 2010/0246836 A1 | 9/2010 | Johnson | |
| 2010/0272276 A1 | 10/2010 | Carraras et al. | |
| 2010/0296666 A1 | 11/2010 | Lin | |
| 2011/0007907 A1 | 1/2011 | Park et al. | |
| 2011/0116643 A1 | 5/2011 | Tiscareno | |
| 2011/0181452 A1 | 7/2011 | Raifel et al. | |
| 2011/0301435 A1 | 12/2011 | Albert | |
| 2011/0305349 A1 * | 12/2011 | Asada | H04R 1/1041 381/74 |
| 2012/0237044 A1 * | 9/2012 | Poulsen | H04R 1/1041 381/58 |
| 2012/0243712 A1 * | 9/2012 | Yamada | H03K 17/08142 381/123 |
| 2012/0250873 A1 | 10/2012 | Bakalos et al. | |
| 2013/0044887 A1 * | 2/2013 | Dong | H04R 3/00 381/59 |
| 2013/0058506 A1 * | 3/2013 | Boor | H03F 3/185 381/122 |
| 2013/0142350 A1 * | 6/2013 | Larsen | H04R 1/1041 381/74 |
| 2013/0177163 A1 | 7/2013 | Hsiao | |
| 2013/0196721 A1 | 8/2013 | Waterman | |
| 2013/0208908 A1 | 8/2013 | Theiler et al. | |
| 2014/0051940 A1 | 2/2014 | Messerschmidt | |
| 2014/0098969 A1 * | 4/2014 | Oliveira | H04R 1/1083 381/74 |
| 2014/0140560 A1 * | 5/2014 | Melanson | H04R 19/04 381/365 |
| 2014/0270208 A1 | 9/2014 | Miller et al. | |
| 2014/0307910 A1 * | 10/2014 | Howlett | H04R 3/00 381/369 |
| 2015/0208166 A1 | 7/2015 | Raghuvanshi | |
| 2015/0334505 A1 | 11/2015 | Crutchfield | |
| 2015/0355880 A1 | 12/2015 | Kraft et al. | |
| 2015/0373474 A1 | 12/2015 | Kraft et al. | |
| 2015/0382106 A1 | 12/2015 | Kraft et al. | |
| 2016/0044429 A1 | 2/2016 | Moffat | |
| 2016/0063986 A1 | 3/2016 | Theiler et al. | |
| 2017/0070834 A1 | 3/2017 | Ben-Ami et al. | |
| 2017/0094401 A1 | 3/2017 | Ben-Ami et al. | |
| 2017/0208415 A1 | 7/2017 | Ojala | |

FOREIGN PATENT DOCUMENTS

| | | | |
|---|---|---|---|
| EP | 2211561 A2 * | 7/2010 | G10L 21/0208 |
| EP | 2314212 | 4/2011 | |
| EP | 2945399 | 11/2015 | |
| WO | WO 2000/010362 | 2/2000 | |
| WO | WO 2008/096125 | 8/2000 | |
| WO | WO 2008/000304 | 1/2008 | |
| WO | WO 2012/167234 | 12/2012 | |
| WO | WO 2014/178054 | 11/2014 | |
| WO | WO 2015105497 A1 * | 7/2015 | H04R 1/1091 |
| WO | WO 2015/166482 | 11/2015 | |
| WO | WO 2015/177787 | 11/2015 | |
| WO | WO 2016/067942 | 5/2016 | |

OTHER PUBLICATIONS

International Preliminary Report on Patentability in International Application No. PCT/IL2015/050430, dated Nov. 1, 2016, 4 pages.

'Dailymail.co.uk' [online]. "Your ear canal could soon be your password: New system uses sound to analyse the shape of 'unique' cavity," Mar. 2016, [retrieved Oct. 4, 2017]. Retrieved from the Internet: URL<http://www.dailymail.co.uk/sciencetech/article-3484262/Your-EAR-canal-soon-password-New-uses-sound-analyse-shape-unique-cavity.html>. 20 pages.

'nec.com' [online]. "NEC develops biometrics technology that uses sound to distinguish individually unique ear cavity shape," Mar. 2016, [retrieved Oct. 4, 2017]. Retrieved from the internet: URL <http://www.nec.com/en/press/201603/global_20160307_01.html>. 6 pages.

'Theguardian.com' [online] "Parrot zik 2.0 review: wireless headphones designed by Phillip Starck," Feb. 2015, [retrieved Oct. 4, 2017]. Retrieved from the internet: URL <https://www.theguardian.com/technology/2015/feb/04/parrot-zik-20-review-wireless-headphones-philippe-starck>. 3 pages.

* cited by examiner

| REG | Register Name | Value | Hex |
|---|---|---|---|
| R41 (29h) | INPUT_MIXER_3 | 384 | 0180 |
| R25 (19h) | LEFT_LINE_INPUT_3_4_VOLUME | 287 | 011F |
| R40 (28h) | INPUT_MIXER_2 | 127 | 007F |
| R2 (2h) | POWER_MANAGEMENT_2 | 9088 | 2380 |
| R4 (4h) | POWER_MANAGEMENT_4 | 771 | 0303 |
| R21 (15h) | INPUT_MIXER_1 | 0 | 0000 |
| R57 (39h) | ANTIPOP_2 | 396 | 018C |
| R45 (2Dh) | OUTPUT_MIXER_1 | 3 | 0003 |
| R28 (1Ch) | LEFT_OUTPUT_VOLUME | 383 | 017F |
| R29 (1Dh) | RIGHT_OUTPUT_VOLUME | 383 | 017F |

FIG. 2

METHODS AND DEVICES FOR OPERATING AN AUDIO PROCESSING INTEGRATED CIRCUIT TO RECORD AN AUDIO SIGNAL VIA A HEADPHONE PORT

This application is a National Stage Application under 35 U.S.C. § 371 and claims the benefit of International Application No. PCT/IL2015/050430, filed Apr. 26, 2015, which claims priority to U.S. Application No. 61/986,895, filed May 1, 2014, the disclosure of which is incorporated herein by reference.

BACKGROUND

The present invention, in some embodiments thereof, relates to audio processing integrated circuit operation and, more specifically, but not exclusively, to operating audio processing integrated circuits for audio playing and recording through a common headphone port.

Audio processing integrated circuits allow playing audio sound data and/or audio streams through one or more speakers and/or headphones, and recoding audio through one or more microphones. The audio processing integrated circuits are peripheral devices of a client terminal and may be connected to headphone ports for input and output of audio signals. The headphone speakers comprise electro-acoustic output transducers designed specifically for audio output, and the microphones comprise electro-acoustic output transducers designed specifically for recording. For example, in mobile audio output applications, the speakers are located in headphones, designed to connect to a mobile device with a phone plug such as a 3.5 millimeter tip-ring-sleeve (TRS) plug. The headphones may optionally have a microphone for audio recording, together referred to as a headset. A headset may be connected to a client terminal using a tip-ring1-ring2-sleeve (TRRS) plug.

As used herein, the phrase aural signal means a signal collected from the inner ear space and/or inside the headsets and/or headphones next to the electro-acoustic output transducer of the headphone.

SUMMARY

According to an aspect of some embodiments of the present invention there is provided a method of recording a signal from a headphone. The method may comprise instructing an audio processing integrated circuit of a client terminal to connect an electrical resistance component between an electrical ground of a client terminal and an electrical ground of one or more electro-acoustic output transducer of a headphone. The method may further comprise instructing the audio processing integrated circuit of the client terminal to accept as microphone input a signal from the one or more electro-acoustic output transducer of the headphone. The method may further comprise recording a signal from the one or more electro-acoustic output transducer of the headphone using the audio processing integrated circuit of the client terminal.

Optionally, the one or more electro-acoustic output transducer is one or more loudspeaker used for playing audio signals of the headphone.

Optionally, the audio processing integrated circuit receives further instructions to simultaneously play back a target audio signal, and the target audio signal is automatically subtracted from the signal to produce an aural noise signal.

Optionally, the signal is recorded via the one or more electro-acoustic output transducer in two or more recording fragment iterations and intermittently playing one or more output audio signal in two or more playing fragment iterations via the one or more electro-acoustic output transducer so that the two or more playing iterations are temporarily intertwined with the two or more recording iterations, and the signal is an aural noise signal.

Optionally, the each fragment of the two or more recording fragment iterations interrupting the output audio signal is inaudible during normal use of the headphone.

Optionally, the electrical resistance is a finite resistance such that the electrical ground of the client terminal and the electrical ground of the one or more electro-acoustic output transducer of the headphone are connected with an electrical resistance.

Optionally, the electrical resistance has a value between zero ohms and 500 ohms.

Optionally, the electrical resistance is connected by enabling a low pass filter of an output audio signal.

Optionally, the electrical resistance is connected by a constant voltage source connected between the electrical ground of the client terminal and the electrical ground of the one or more electro-acoustic output transducer of the headphone.

Optionally, the computer readable medium comprising computer executable instructions adapted to perform the method.

According to an aspect of some embodiments of the present invention there is provided a computer program product for a method of recording a signal from a headphone. The computer program product may comprise a computer readable storage medium. The computer program product may further comprise first program instructions to instruct an audio processing integrated circuit of a client terminal to connect an electrical resistance component between an electrical ground of a client terminal and an electrical ground of one or more electro-acoustic output transducer of one or more headphone. The computer program product may further comprise second program instructions to instruct the audio processing integrated circuit of the client terminal to accept as microphone input a signal from the one or more electro-acoustic output transducer of the one or more headphone. The computer program product may further comprise third program instructions to record a signal from the one or more electro-acoustic output transducer of the one or more headphone using the audio component of the client terminal. The first, second and third program instructions may be stored on the computer readable storage medium.

According to an aspect of some embodiments of the present invention there is provided a rewiring adaptor device to enable recording a signal from a headphone. The rewiring adaptor device may comprise a headphone interface to connect one or more headphone having one or more electro-acoustic output transducer. The rewiring adaptor device may further comprise one or more male audio interface to connect a client terminal interface. The rewiring adaptor device may further comprise an electrical resistor component between a conductor of the headphone interface and the one or more male audio interfaces. The resistor enables recording of a audio signal from the one or more electro-acoustic output transducer using instructions of an audio processing integrated circuit of a client terminal to connect the client terminal interface to a microphone input of the audio processing integrated circuit.

Optionally, the electrical resistor component has a resistance value between zero ohms and 500 ohms.

Optionally, the electrical resistor component is connected between a ground conductor of the headphone interface and one or more ground conductor of the one or more male audio interface.

Optionally, the electrical resistor component is connected between one or more output audio conductor of the headphone interface and one or more input audio conductor of the one or more male audio interface.

Optionally, the rewiring adaptor device does not require a power source.

According to an aspect of some embodiments of the present invention there is provided a client terminal system for recording from a headphone. The client terminal system may comprise one or more user interface for receiving user instructions and displaying system status to user. The client terminal system may further comprise one or more headphone interface for connecting one or more headphone with one or more electro-acoustic output transducer used to record an audio signal. The client terminal system may further comprise one or more audio processing integrated circuit for receiving a two or more adapting instructions. The client terminal system may further comprise one or more processing unit. The processing unit may be configured for adapting the one or more audio processing integrated circuit to connect an electrical resistance component between a ground conductor of the one or more audio processing integrated circuit and the one or more headphone interface. The processing unit may be further configured for adapting the one or more audio processing integrated circuit to record a signal from the one or more headphone interface. The processing unit may be further configured for recording the signal from the one or more headphone interface.

Optionally, the client terminal system is any from the list of a smartphone, a mobile phone, a palmtop computer, a laptop computer, a tablet computer, a notebook computer, a personal computer, a music player, and a video player, Bluetooth earphones.

Optionally, the headphone is any from the list of a headphone, an earpiece, an earspeaker, a headphone, a headset, a stereo headset, a mono-aural headset, a stereo headphone, a mono-aural headphone, a stereo earphone, a mono-aural earphone, an internal speaker, and an external speaker.

According to an aspect of some embodiments of the present invention there is provided a method of recording a signal from a headphone. The method may comprise instructing a user to insert an audio rewiring adaptor between a headphone socket of a client terminal and a headphone plug, thereby connecting an electrical resistance component between an electrical conductor of the headphone socket and an electrical conductor of one or more electro-acoustic output transducer of a headphone. The method may further comprise instructing an audio processing integrated circuit of the client terminal to accept as microphone input a signal from the one or more electro-acoustic output transducer of the headphone. The method may further comprise recording a signal from the one or more electro-acoustic output transducer of the headphone connected to the headphone plug using the audio processing integrated circuit of the client terminal.

Optionally, the electrical resistor component may have a resistance value between 5 ohms and 500 ohms.

Optionally, the electrical resistor component is connected between a ground conductor of the headphone socket and one or more ground conductor of the headphone plug.

Optionally, the electrical resistor component is connected between one or more output audio conductor of the headphone socket and one or more input audio conductor of the headphone plug.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods, and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a flowchart of a method for operating a audio processing integrated circuit to record audio signal(s) from one or more electro-acoustic output transducer(s) which are electronically connected to a headphone port thereof while the headphone port is simultaneously used for streaming source signals to these one or more electro-acoustic output transducer(s), according to some embodiments of the invention;

FIG. 1B is a flowchart of a method for operating a audio processing integrated circuit to record audio signal(s) from one or more electro-acoustic output transducer(s) which are electronically connected to a headphone port thereof while the headphone port is intermittently used for streaming source signals to these one or more electro-acoustic output transducer(s), according to some embodiments of the invention;

FIG. 2 is a table of register values to configure an audio processing integrated circuit to connect an electrical resistance between a ground conductor of an electro-acoustic output transducer and a ground conductor of an audio processing integrated circuit, according to some embodiments of the invention;

DETAILED DESCRIPTION

Figure 1A:
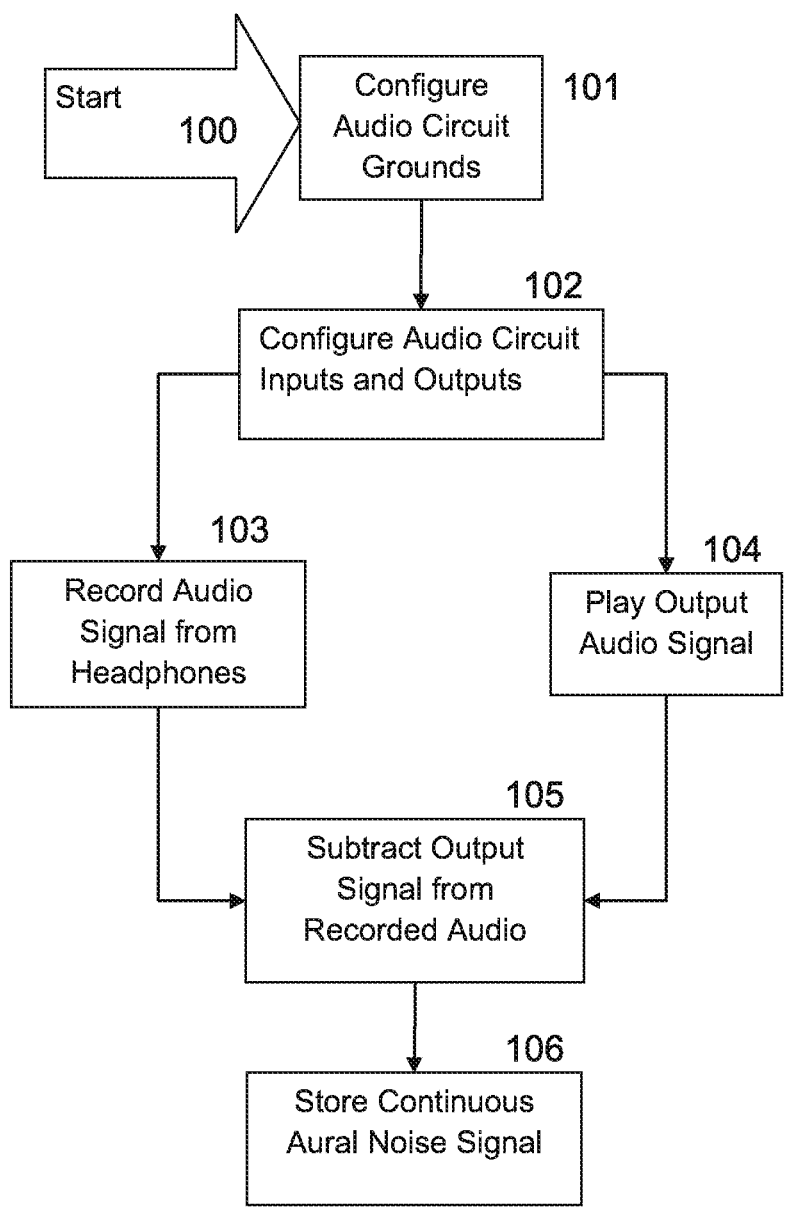

The present invention, in some embodiments thereof, relates to audio processing integrated circuit operation and, more specifically, but not exclusively, to operating audio processing integrated circuits for audio playing and recording through a common headphone port.

Ordinary earphones and/or headphones that do not have a built in microphone cannot be used for applications that require a microphone, for example a phone call. Audio data recording from inside the ear may also be useful for other applications such as noise cancellation, pulse measurement, temperature measurement, and/or the like. For example, U.S. provisional patent application 61/818,489 gives details on how the recording of an aural noise signal from inside the ear may be used to calculate a noise reduced output signal.

According to some embodiments of the invention described herein, an audio processing integrated circuit of a client terminal is adapted for recording an aural signal from the electro-acoustic output transducer of a headphone. As used herein, the term/phrase headphone may refer to an earphone, headset, or the like. As used herein, the phrase client terminal means a computerized system capable of audio output, such as a personal computer, a laptop, a palmtop, a personal data assistant, a smartphone, a mobile phone, a music player, a video player, Bluetooth earphones, and the like. By adapting the audio processing integrated circuit of the client terminal to connect an electronic resistance component between one or more conductors of the electronic audio processing integrated circuit of the client terminal, and one or more conductors of the output headphones, the headphone electro-acoustic output transducer may be used to record an audio signal from the headphone space. As used herein, the phrase electronic resistance component means a resistor as used in the practice of electrical engineering. The electronic resistance component may be connected using an adapter between the client terminal's output headphone port and the headphone plug. When using an adapter device, the electronic resistance component may be connected between the grounds of the plug and socket, or between one or more output channel and the input channel on the client terminal side.

According to some embodiments of the invention described herein, there are provided methods and devices to record an audio signal from an electro-acoustic output transducer of a headphone. A method for collecting an audio signal from the headphone may include an action of instructing a processor of a client terminal to configure an audio processing integrated circuit to incorporate an electronic resistance component between the ground of the client terminal headphone port and the ground of the audio processing integrated circuit. The method may include an action of instructing a processor of a client terminal to configure an audio processing integrated circuit to record an audio signal from an electro-acoustic output transducer of a headphone and/or headset. The method may include an action of storing an audio signal from an electro-acoustic output transducer. A rewiring adaptor device may be connected between the audio headphone port of a client terminal and the audio male plug of a headphone, such that the rewiring adaptor device introduces an electronic resistance component between a conductor of the headphone port of a client terminal and a conductor of the audio plug of the headphone and/or headset.

Optionally, the audio processing integrated circuit of the client terminal is a sound card, an audio processing integrated circuit, an audio integrated circuit, part of a peripheral component integrated circuit, part of a central processor integrated circuit, and the like.

Optionally, the client terminal is a system for receiving an output audio signal and comprising an audio processing integrated circuit as a component of the client terminal for converting the output audio signal to corresponding electronic voltages of a headphone port of the client terminal, such that a headset connected to the headphone port plays the output audio signal. For example, the client terminal is a mobile phone, a smartphone, a personal computer, a laptop, a tablet, a music player, a video player, Bluetooth earphones, and the like. For example, and audio processing integrated circuit is a sound card, a chip, an integrated circuit, and the like.

Optionally, the electronic resistance component is connected between the ground of the audio processing integrated circuit and the ground of the headphone port.

Optionally, the electronic resistance component is connected between the ground of the headphone port of the client terminal and the ground of the headphones, external to the client terminal.

Optionally, the electronic resistance component is connected between the ground of the headphone port of the client terminal and the ground of the headphones using an adapter device.

Optionally, the electronic resistance component is connected between the microphone conductor of the headphone port of the client terminal and the output of one or more electro-acoustic output transducers of the headphones using an adapter device. For example, the microphone input of the audio processing integrated circuit is connected to the left side electro-acoustic output transducer of the headphones using an electronic resistance component in an adapter device. For example, the microphone input of the audio processing integrated circuit is connected to the right side electro-acoustic output transducer of the headphones using an electronic resistance component in an adapter device. For example, the microphone input of the audio processing integrated circuit is connected to both the left and right side electro-acoustic output transducer of the headphones in parallel using two electronic resistance components in an adapter device.

Optionally, the electronic resistance component has a range of resistance values between 0 ohms and 500 ohms. For example, the electronic resistance component has a resistance value of 0, 5, 10, 30, 50, 100 200, 400, 450, 500 ohms, or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, which is a method for operating a audio processing integrated circuit to record audio signal(s) from one or more electro-acoustic output transducer(s) which are electronically connected to a headphone port thereof while the headphone port is simultaneously used for streaming source signals to these one or more electro-acoustic output transducer(s), according to some embodiments of the invention. This method may be implemented automatically by a computerized client terminal using processor instructions to configure an audio processing integrated circuit. To enable 100 the simultaneous recording of an audio signal from electro-acoustic output transducer while the electro-acoustic output transducer may be playing back an audio output signal, the audio processing integrated circuit may be configured so that there is a resistive component between the ground conductors of the electro-acoustic output transducer and the audio processing integrated circuit 101. The audio processing integrated circuit may also be configured to instruct the audio processing integrated circuit mixer to connect the conductors of the electro-acoustic output transducer as a microphone input of the audio processing integrated circuit 102. The audio signal from the electro-acoustic output transducer may then be recorded 103 while the electro-acoustic output transducer simultaneously may play back an output audio signal 104. The output audio signal may be subtracted from the recorded audio signal to produce the aural noise signal 105, and may be stored for further use 106. For example, a configuration of the audio processing integrated circuit and an electric connection between the grounds of the input path and output path, to utilize one or more output speakers, such as output electrostatic transducers, of a headphone to record input.

Figure 1B:
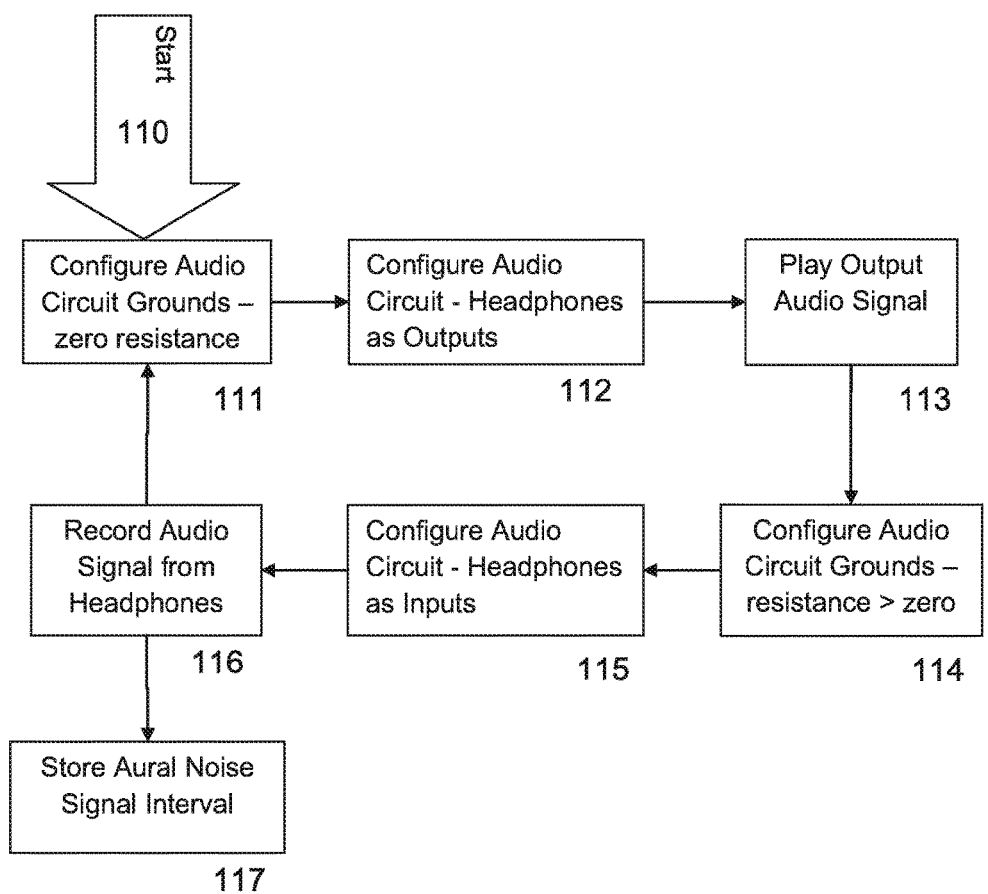

Reference is now made to FIG. 1B, which is a flowchart of a method for operating a audio processing integrated circuit to record audio signal(s) from one or more electro-acoustic output transducer(s) which are electronically connected to a headphone port thereof while the headphone port is intermittently used for streaming source signals to these one or more electro-acoustic output transducer(s), according to some embodiments of the invention. This method may be implemented automatically by a computerized client terminal using processor instructions to configure an audio processing integrated circuit. Upon enabling 110 the recording in intervals, the audio processing integrated circuit may be configured for no resistance between the audio processing integrated circuit ground and the electro-acoustic output transducer ground 111, the electro-acoustic output transducer may be connected as output using the audio processing integrated circuit mixer 112, and the audio output signal may be played on the electro-acoustic output transducer 113 for a output interval. When the output interval is complete, the audio processing integrated circuit may be configured for resistance greater than zero between the audio processing integrated circuit ground and the electro-acoustic output transducer ground 114. The electro-acoustic output transducer may be connected as input using the audio processing integrated circuit mixer 115, and an audio signal may be recorded from the electro-acoustic output transducer 116 for a recording interval. When the recording interval is complete, the aural noise signal may be stored 117 and the next output interval may be initiated 111.

Figure 4A:
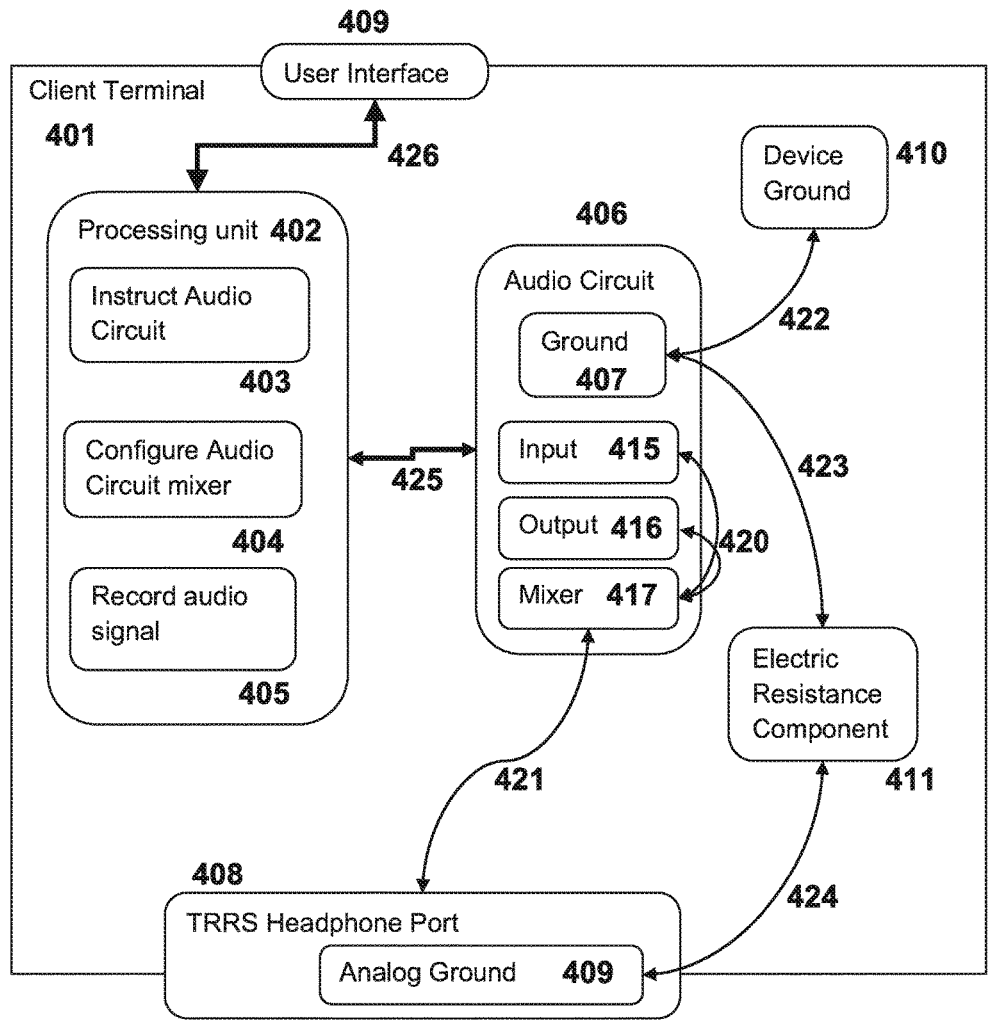
FIG. 4A is a schematic illustration of a client terminal for recording an audio signal from an electro-acoustic output transducer using an audio processing integrated circuit of the client terminal, according to some embodiments of the invention.

Reference is now made to FIG. 4A, which is a schematic illustration of a client terminal for recording an audio signal from an electro-acoustic output transducer using an audio processing integrated circuit of the client terminal, according to some embodiments of the invention. The client terminal 401 may contain a user interface 409, one or more processors 402, one or more audio processing integrated circuits 406, and a headphone port 408. The processor may be connected to the user interface with a digital data connection 426, and may be connected to the audio processing integrated circuit with another digital data connection 425, where both connections may use the same infrastructure component of the device. For example, a peripheral digital data bus is used as a digital data connection. The audio processing integrated circuit may comprise an input circuit 415 for recording, and output circuit 416 for audio output, and a mixer 417 for configuring which physical connections are used for input and output. The audio processing integrated circuit ground 407 may always be connected 422 to the device ground 410. The processor may be configured to instruct the audio processing integrated circuit 403 to connect an electric resistance component 411 between the audio processing integrated circuit ground 407 and the headphone port analog ground 409. The processor may be configured as at 404 to send a configuration to the audio processing integrated circuit mixer 417, telling the audio processing integrated circuit mixer 417 when the headphone port 408 is to be connected 421 to the audio input circuit 415, the audio output circuit 416, or both 420. The processor may be configured to record an audio signal 415 using the audio processing integrated circuit 416.

Figure 4B:
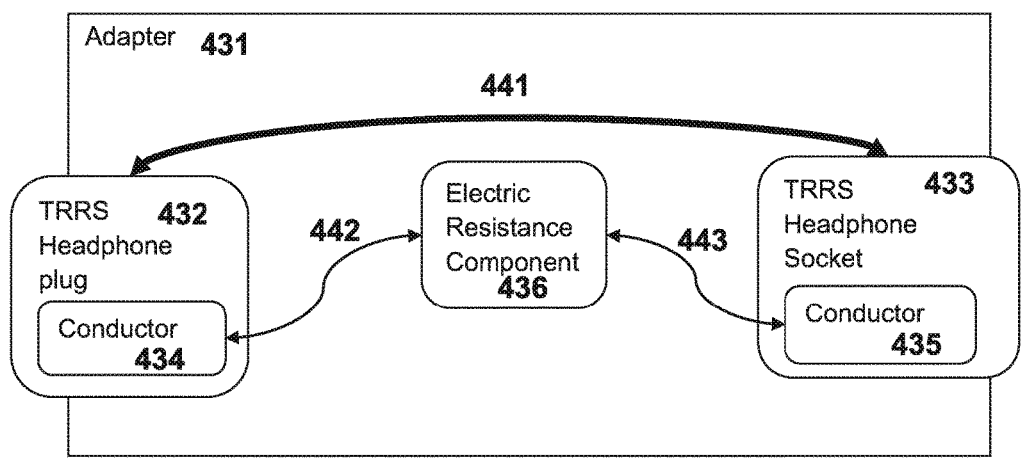
FIG. 4B is a schematic illustration of a rewiring adaptor device for connecting a resistance between a conductor of an electro-acoustic output transducer and a conductor of an audio processing integrated circuit, according to some embodiments of the invention.

Reference is now made to FIG. 4B, which is a schematic illustration of an rewiring adaptor device for connecting a resistance between a conductor of an electro-acoustic output transducer and a conductor of an audio processing integrated circuit, according to some embodiments of the invention. The adapter may comprise a headphone plug 432, a headphone socket 433, and an electric resistance component 436.

The headphone socket and/or plug may be one or more tip-ring1-ring2-sleeve, tip-ring-sleeve, tip-sleeve type, and the like devices. A conductor 434 of the headset plug 432 may be connected 442 to the electronic resistance component 436, and the electronic resistance component 436 in turn is connected 443 to a conductor 435 of the headphone socket 433. The other leads of the headphone port and plug may be connected with electric conductors 441.

Optionally, the adaptor, the client terminal, and/or the headphones have additional input and/or output interfaces such as analog earphone interfaces.

Figure 4C:
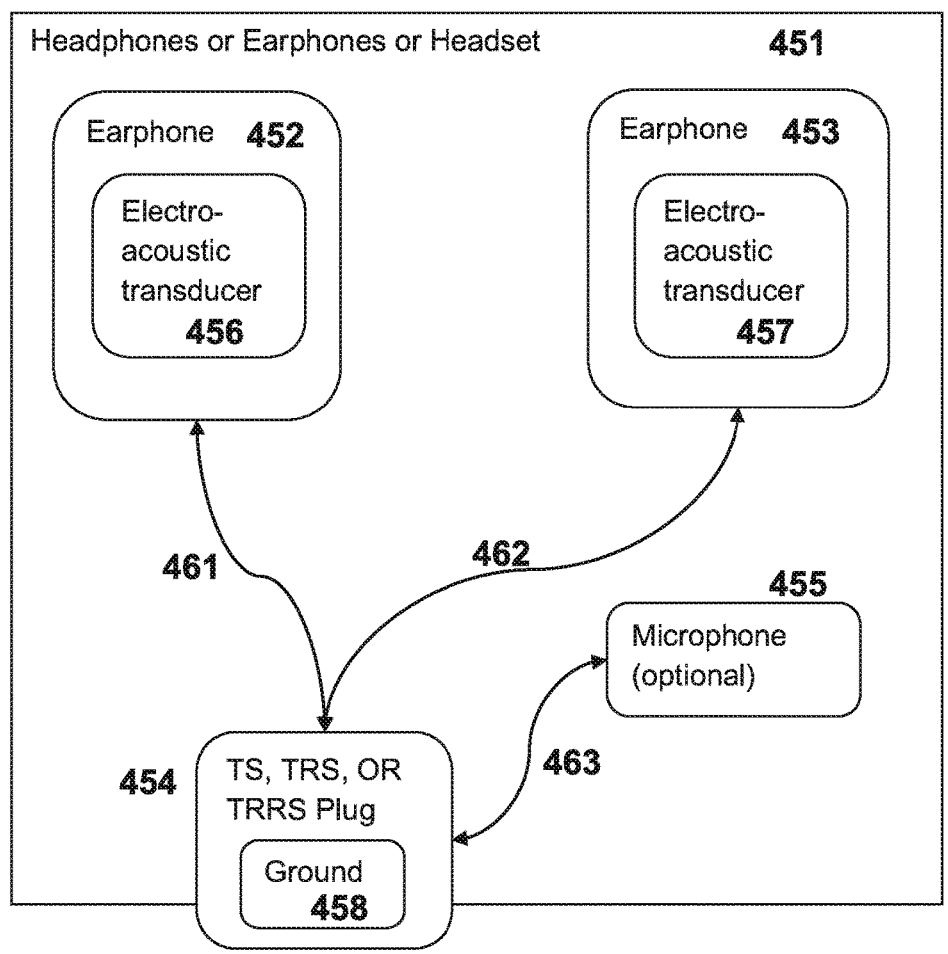
FIG. 4C is a schematic illustration of a headset, according to some embodiments of the invention.

Reference is now made to FIG. 4C, which is a schematic illustration of a headset, according to some embodiments of the invention. The headset 451 may have one or two earpieces as at 452 and 453, optionally connected together by a headband. Each earpiece may have one or more electro-acoustic output transducer as at 456 and 457, electrically connected as at 461 and 462 to a headset plug 454. Optionally, the headset has a microphone 455 also connected 463 to the headset plug 454.

Optionally, an aural signal is collected continuously in parallel to output of output audio signal from electro-acoustic output transducer, and output audio signal is subtracted from aural signal to produce an aural noise signal.

Optionally, an aural signal is collected from electro-acoustic output transducer at intervals intertwined with output of output audio signal from electro-acoustic transducer, such that electro-acoustic output transducer alternate between collecting an aural signal and output of an audio signal. For example, an aural signal is collected for a time interval of 3 milliseconds and output audio signal is outputted for 297 milliseconds. For example, an aural signal is collected for a time interval of 0.5 milliseconds and output audio signal is outputted for 49.5 milliseconds. For example, an aural signal is collected for a time interval of 10 milliseconds and output audio signal is outputted for 490 milliseconds. These examples may allow collecting an input signal from the output speakers without an audible change in the acoustic output.

Reference is now made to FIG. 2, which is a table of register values to configure an audio processing integrated circuit to connect an electrical resistance between a ground conductor of an electro-acoustic output transducer and a ground conductor of an audio processing integrated circuit. In this table, the first column may be the register addresses in decimal and hexadecimal numbers, the second column may be the name of the register, the third column may be the decimal value that may be assigned to register, and the fourth column may be the hexadecimal value assigned to the register. When all of the register values of this list are assigned the corresponding values, the audio processing integrated circuit may be configured to record an audio signal from the electro-acoustic output transducers.

Optionally, during simultaneous recording the register values of the audio processing integrated circuit are set to an initial configuration. For example, the register values of the Wolfson Microelectronics audio processing integrated circuit WM1811A are initially configured as in FIG. 2.

Optionally, during interleaved recording, the register values of the audio processing integrated circuit are set to an initial configuration and at the beginning and end of each recoding interval, one or more registers are modified. For example, the register values of the Wolfson Microelectronics audio processing integrated circuit WM1811A are initially configured as in FIG. 2, and at the beginning of each recording interval the register R1 names POWER MANAGEMENT 1 is set to a value of 3, and the end of every recording interval this register is set to a value of 771.

Optionally, headphones contain one or more electro-acoustic output transducers. For example, the headphones are mono-aural and contain one electro-acoustic output transducers. For example, the headphones are bi-aural, such as stereo headphones and contain two electro-acoustic output transducers. For example, the headphones are bi-aural, such as stereo, headphones with two-way speakers for each side thereby comprising four electro-acoustic output transducers in the headphones.

As used herein, the terms headphones, earphones, earpiece, and headset may refer to any device that contains an electro-acoustic output transducer from which an audio signal may be played back and/or recorded.

The term headsets as used herein may consist of a headband holding one or two earpieces in place over the ears, each earpiece containing one or more electro-acoustic output transducer. An insulated electronic cable assembly may enclose the conductor leads from the one or more earpieces to one or more audio plug for connection to a client terminal. One or more microphones may be connected to the headband, earpiece, and/or cable. The term headphone as used herein mean s a device comprising two earpieces connected by an insulated electronic cable assembly with an audio connecter at one end.

Optionally, an audio plug and/or socket are any male electronic connector that is used for connecting an external electro-acoustic output transducer to an audio processing integrated circuit of a client terminal. For example, an audio plug and/or headphone port are 2 millimeter (mm) mono-aural audio connectors containing two conductors—a signal and a ground. For example, an audio plug and/or headphone port are 2.5 mm stereo connectors, containing three conductors—a left signal, a right signal, and a ground. For example, an audio plug and/or headphone port are 3.5 mm TRRS 4-conductor connectors. For example, an audio plug and/or headphone port are 3.5 mm TRS 3-conductor connectors.

Figure 3A:
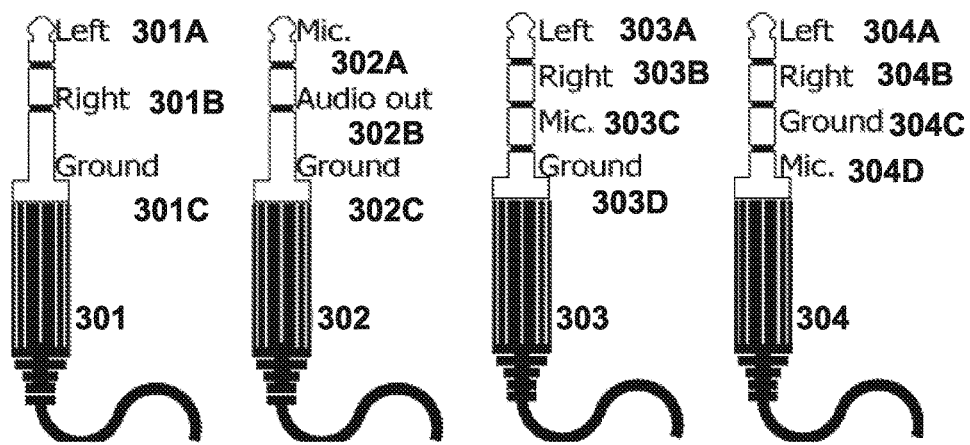
FIG. 3A is a schematic illustration of different configurations of an exemplary audio connector of headphones which electronically connect a headphone to the audio processing integrated circuit in manner that the audio processing integrated circuit is used for recording and playing audio, according to some embodiments of the invention.
Figure 3A:
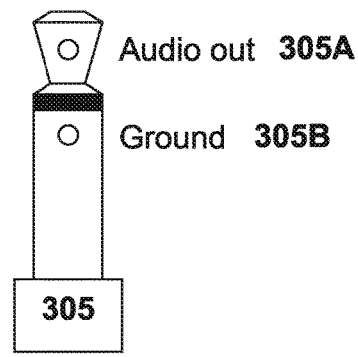

Reference is now made to FIG. 3A, which is a schematic illustration of different configurations of audio connectors, according to some embodiments of the invention. A stereo headphone may have a three conductor connector as at 301 with a left output channel connected to the tip 301A, a right output channel connected to the ring 301B and an audio ground connected to the sleeve 301C. A mono headset may have a three conductor connector as at 302 with a microphone input connected to the tip 302A, an audio output channel connected to the ring 302B and an audio ground connected to the sleeve 302C. A stereo headset may have a four conductor connector as at 303 with a left output channel connected to the tip 303A, a right output channel connected to the first ring 303B, a microphone input connected to the second ring 303C, and an audio ground connected to the sleeve 303D. A stereo headset may have a four conductor connector as at 304 with a left output channel connected to the tip 304A, a right output channel connected to the first ring 304B, an audio ground connected to the second ring 304C, and a microphone input connected to the sleeve 304D. A mono headphone may have a two conductor connector as at 305 with an audio output channel connected to the tip 305A, and an audio ground connected to the sleeve 305B.

Optionally, the audio plug is of a diameter between 1 and 10 mm. For example, the audio plug diameter is 2 mm, 2.5 mm, 3.5 mm, 6.35 mm, or the like.

Optionally, a headphone may connect to a client terminal with a male plug. Optionally, a headphone may connect to a client terminal with a headphone port.

Optionally, a TRRS plug is configured with the Open Mobile Terminal Platform (OMTP) standard and the audio ground is connected to the sleeve. Optionally, a TRRS plug is configured with the Cellular Telecommunications and Internet Association (CTIA) standard and the audio ground is connected to ring2.

Optionally, the audio plug is a miniature audio plug. Optionally, the audio plug is a sub-miniature audio plug.

Figure 3B:
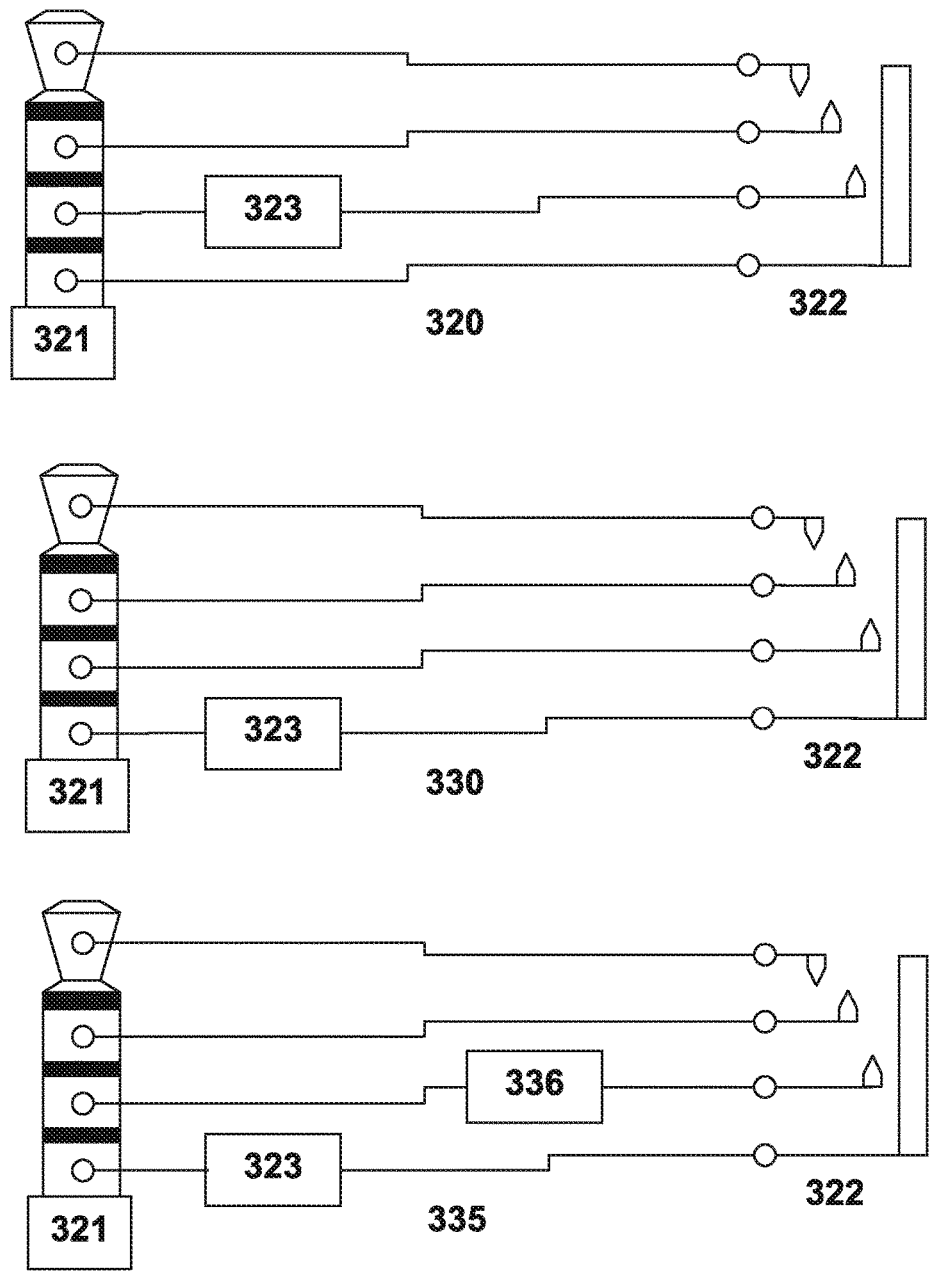
FIG. 3B is a schematic illustration of electrical wiring diagrams of TRRS-TRRS rewiring adaptor devices for connecting a resistance between a ground conductor of an electro-acoustic output transducer and a ground conductor of an audio processing integrated circuit, according to some embodiments of the invention.

Reference is now made to FIG. 3B, which is a schematic illustration of electrical wiring diagrams of TRRS-TRRS rewiring adaptor devices for connecting a resistance between a ground conductor of an electro-acoustic output transducer and a ground conductor of an audio processing integrated circuit, according to some embodiments of the invention. A TRRS headphone port on a client terminal may accept the TRRS plug 321 of the rewiring adaptor device 320 and a TRRS headphone plug may be inserted into the TRRS headphone port 322 of the device, thereby connecting an electric resistance component 323 between the second rings of the two TRRS connectors, in compliance with the CTIA standard. Optionally, a TRRS headphone port on a client terminal accepts the TRRS plug 321 of the rewiring adaptor device 330 and a TRRS headphone plug is inserted into the TRRS headphone port 322 of the device, thereby connecting an electric resistance component 323 between the sleeves of the two TRRS connectors, in compliance with the OMTP standard. Optionally, a TRRS headphone port on a client terminal accepts the TRRS plug 321 of the rewiring adaptor device 340 and a TRRS headphone plug is inserted into the TRRS headphone port 322 of the device. The rewiring adapter device 340 connects an electric resistance component 323 between the sleeves of the two TRRS connectors and a second electric resistance component 336 between the second rings of the two TRRS connectors.

Figure 3C:
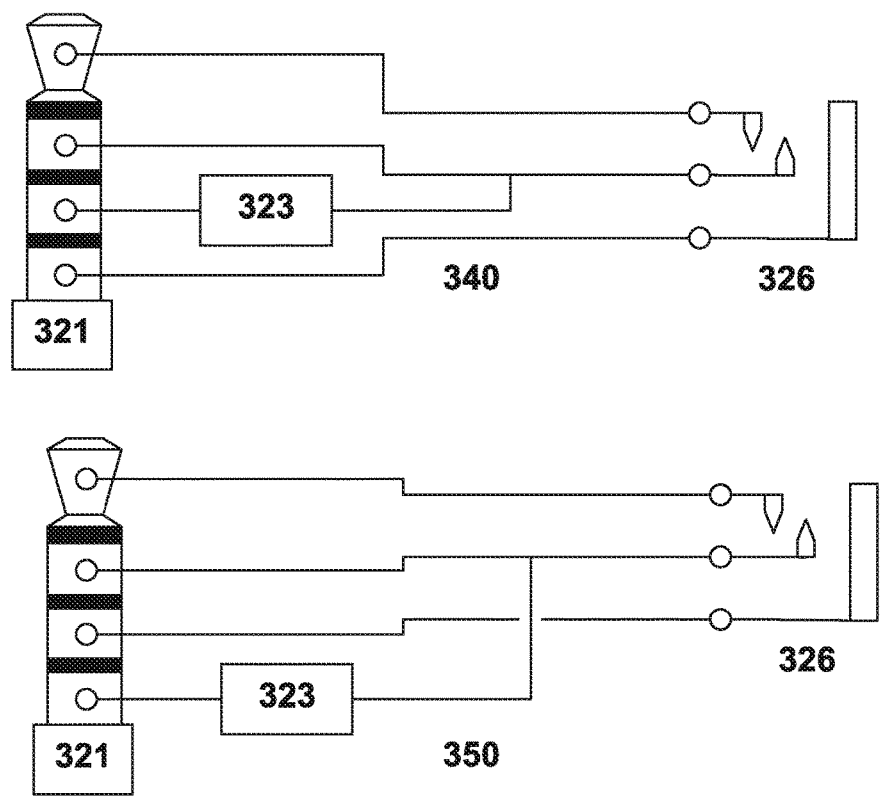
FIG. 3C is a schematic illustration of electrical wiring diagrams of TRRS-TRS rewiring adaptor devices for connecting a resistance between an electro-acoustic output transducer and a microphone input of an audio processing integrated circuit, according to some embodiments of the invention.

Reference is now made to FIG. 3C, which is a schematic illustration of electrical wiring diagrams of TRRS-TRS rewiring adaptor devices for connecting a resistance between an electro-acoustic output transducer and a microphone input of an audio processing integrated circuit, according to some embodiments of the invention. A TRRS headphone port on a client terminal may accept the TRRS plug 321 of the rewiring adaptor device 340 and a TRS headphone plug may be inserted into the TRS headphone port 326 of the device. The rewiring adaptor device 340 connects an electric resistance component 323 between the second ring of the TRRS connector 321 and the ring of the TRS connector 326 as well as shorting the first ring of the TRRS connector 321 and the ring of the TRS connector 326. Optionally, A TRRS headphone port on a client terminal may accept the TRRS plug 321 of the rewiring adaptor device 350 and a TRS headphone plug may be inserted into the TRS headphone port 326 of the device. The rewiring adaptor device 350 connects an electric resistance component 323 between the sleeve of the TRRS connector 321 and the ring of the TRS connector 326 as well as shorting the first ring of the TRRS connector 321 and the ring of the TRS connector 326.

Figure 3D:
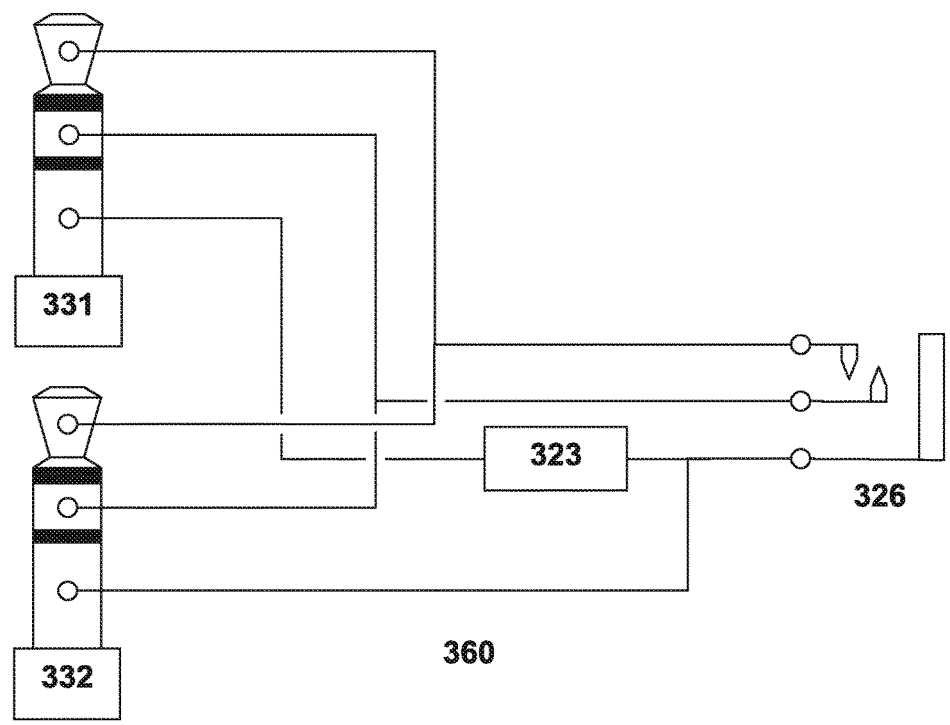
FIG. 3D is a schematic illustration of an electrical wiring diagram of a 2×TRS-TRS rewiring adaptor device for connecting a resistance between a ground conductor of an electro-acoustic output transducer and a ground conductor of an audio processing integrated circuit, according to some embodiments of the invention.

Reference is now made to FIG. 3D, which is a schematic illustration of an electrical wiring diagram of a 2×TRS-TRS rewiring adaptor device for connecting a resistance between a ground conductor of an electro-acoustic output transducer and a ground conductor of an audio processing integrated circuit, according to some embodiments of the invention. Two TRS headphone ports on a client terminal, such as a laptop or personal computer, one for audio headphone output and one for audio microphone input, may accept two TRS plugs 331 and 332 of the rewiring adaptor device 360 and a TRS headphone plug may be inserted into the TRS headphone port 326 of the device. The rewiring adaptor device 360 connects an electric resistance component 323 between the sleeve of the TRS output connector 331 and the sleeve of the TRS connector 326 as well as shorting the sleeve of the TRS input connector 332 and the sleeve of the TRS connector 326.

Figure 3E:
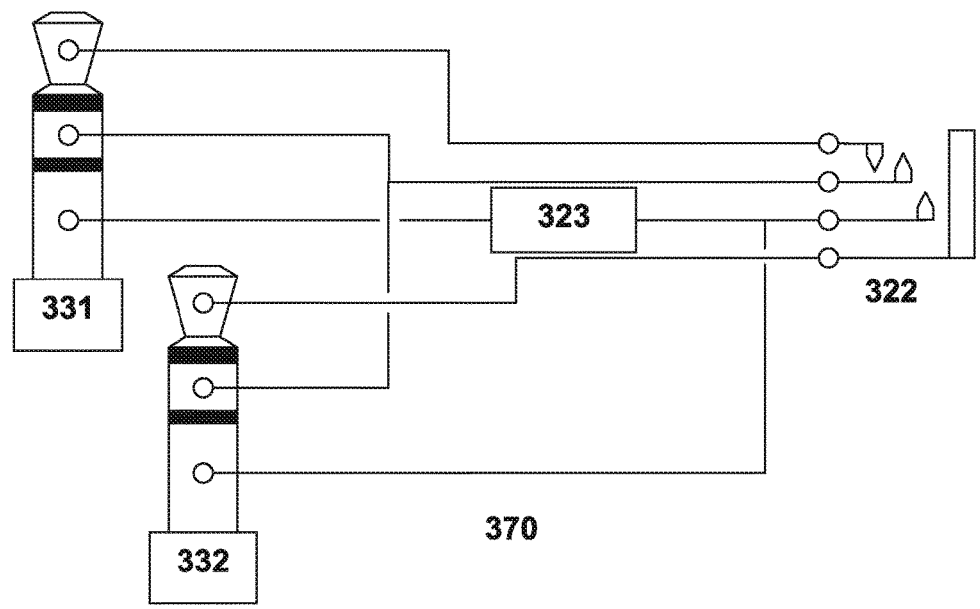
FIG. 3E is a schematic illustration of electrical wiring diagrams of 2×TRS-TRRS rewiring adaptor devices for connecting a resistance between a ground conductor of an electro-acoustic output transducer and a ground conductor of an audio processing integrated circuit, according to some embodiments of the invention.
Figure 3E:
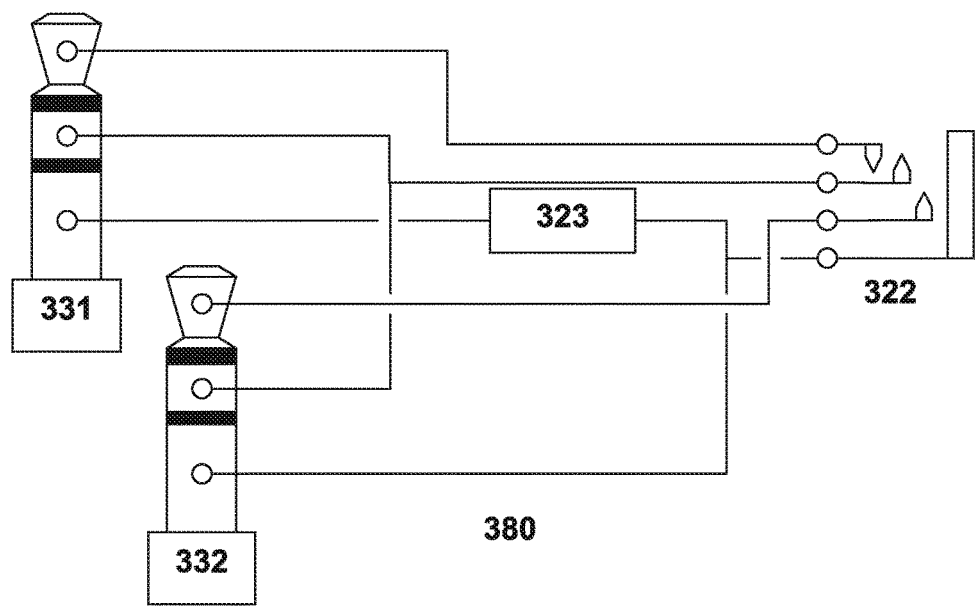

Reference is now made to FIG. 3E, which is a schematic illustration of electrical wiring diagrams of 2×TRS-TRRS rewiring adaptor devices for connecting a resistance between a ground conductor of an electro-acoustic output transducer and a ground conductor of an audio processing integrated circuit, according to some embodiments of the invention. Two TRS headphone ports on a client terminal, such as a laptop or personal computer, one for audio headphone output and one for audio microphone input, may accept two TRS plugs 331 and 332 of the rewiring adaptor device 370 and a TRRS headphone plug may be inserted into the TRRS headphone port 322 of the device. The rewiring adaptor device 370 connects an electric resistance component 323 between the sleeve of the TRS output connector 331 and the second ring of the TRRS connector 322 as well as shorting the sleeve of the TRS input connector 332 and the second ring of the TRRS connector 322. Optionally, two TRS headphone ports on a client terminal, such as a laptop or personal computer, one for audio headphone output and one for audio microphone input, may accept two TRS plugs 331 and 332 of the rewiring adaptor device 380 and a TRRS headphone plug may be inserted into the TRRS headphone port 322 of the device. The rewiring adaptor device 380 connects an electric resistance component 323 between the sleeve of the TRS output connector 331 and the sleeve of the TRRS connector 322 as well as shorting the sleeve of the TRS input connector 332 and the sleeve of the TRRS connector 322.

Optionally, the headphones do not contain an audio microphone. For example, the headphones are stereo headphones connected to a client terminal with a two output channel, 3-conductor, tip-ring-sleeve 3.5 millimeter plug.

Optionally, the headphones contain an audio microphone and are connected to a client terminal with a two output channel, 4-conductor, tip-ring-ring-sleeve 3.5 millimeter plug.

Optionally, an audio processing integrated circuit is a sound card, sound circuit, audio integrated circuit (IC), sound chip, sound IC, and the like. For example, audio processing integrated circuits are Wolfson Microelectronics part numbers WM1811A, WM5102, WM5110, WM9714, WM8994, and the like. For example, audio processing integrated circuits are Apple part numbers 338S0589, 338S1077, and the like. For example, audio processing integrated circuits are Qualcomm part number WCD9310, Maxim Integrated Products part number MAX98089, Cirrus Logic part number CS42L73, and the like.

Optionally, the audio processing integrated circuit has a separate digital ground connected to the device ground, and an analog ground connected to the headphones. Optionally, a low pass filter provides a resistance component between the audio processing integrated circuit ground and the headphone ground. Optionally, a constant or variable electric voltage source provides a resistance between the audio processing integrated circuit ground and the headphone ground. Optionally the resistance component is inside the audio processing integrated circuit. Optionally, the resistance component is inside the client device. Optionally, the resistance component is inside an external adapter between the client terminal and the headphones. Optionally, the resistance component is inside the headphones.

Optionally, an adapter contains one or more circuits used as audio filters and/or amplifiers.

Optionally, an audio processing integrated circuit receives an analogue and/or digital input from the headphones.

Optionally, an adapter receives an analogue and/or digital input from the audio processing integrated circuit.

Optionally, a headphone receives an analogue and/or digital input from the audio processing integrated circuit.

Optionally, the adapter receives parameters for the adapter's action. For example, the adapter receives parameters for switching time between output and recording, or choosing between simultaneous output and recording or intermittent output and recording. For example, the adapter receives parameters for applying audio filters.

Optionally, an additional microphone is connected to the headset's microphone conductors of the audio connector.

Optionally, an audio processing integrated circuit receives input from several electro-acoustic output transducers and/or the microphones, and transfers the audio signal to the audio device in one or more input conductors using multiplexing of the one or more audio conductors.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant audio processing integrated circuits will be developed and the scope of the term audio processing integrated circuit is intended to include all such new technologies a priori.

It is expected that during the life of a patent maturing from this application many relevant audio connectors will be developed and the scope of the term audio connector is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of recording a signal from a headphone, comprising:
   a client terminal automatically instructing that an audio processing integrated circuit of said client terminal switch from:
   (i) having no electrical resistance between an electrical ground of said client terminal and an electrical ground of at least one electro-acoustic output transducer of a headphone, to
   (ii) connecting an electrical resistance component between the electrical ground of said client terminal and the electrical ground of the at least one electro-acoustic output transducer of the headphone;
   instructing said audio processing integrated circuit of said client terminal to accept as microphone input a signal from said at least one electro-acoustic output transducer of said headphone; and
   recording a signal from said at least one electro-acoustic output transducer of said headphone using said audio processing integrated circuit of said client terminal.

2. The method of claim 1, wherein said at least one electro-acoustic output transducer is at least one loudspeaker used for playing audio signals of said headphone.

3. The method of claim 1, wherein said audio processing integrated circuit receives further instructions to simultaneously play back a target audio signal, and said target audio signal is automatically subtracted from said signal to produce an aural noise signal.

4. The method of claim 1, wherein:
   said signal is recorded via said at least one electro-acoustic output transducer in a plurality of recording fragment iterations; and
   said at least one electro-acoustic output transducer intermittently plays at least one output audio signal in a plurality of playing fragment iterations so that said plurality of playing fragment iterations are temporarily intertwined with said plurality of recording fragment iterations, and said signal is an aural noise signal.

5. The method of claim 4, wherein each fragment of said plurality of recording fragment iterations interrupting said output audio signal is inaudible during normal use of said headphone.

6. The method of claim 1, wherein said electrical resistance component has a finite resistance such that said electrical ground of said client terminal and said electrical ground of said at least one electro-acoustic output transducer of said headphone are connected with an electrical resistance.

7. The method of claim 6, wherein said electrical resistance component has an electrical resistance with a value between zero ohms and 500 ohms.

8. The method of claim 1, wherein said electrical resistance component is connected by enabling a low pass filter of an output audio signal.

9. The method of claim 1, wherein said electrical resistance component is connected by a constant voltage source connected between said electrical ground of said client terminal and said electrical ground of said at least one electro-acoustic output transducer of said headphone.

10. A computer readable storage medium comprising computer executable instructions that, when executed by one or more processors, cause performance of operations, including:
    a client terminal automatically instructing that an audio processing integrated circuit of said client terminal switch from:
    (i) having no electrical resistance between an electrical ground of said client terminal and an electrical ground of at least one electro-acoustic output transducer of a headphone, to
    (ii) connecting an electrical resistance component between the electrical ground of said client terminal and the electrical ground of the at least one electro-acoustic output transducer of the headphone;
    instructing said audio processing integrated circuit of said client terminal to accept as microphone input a signal from said at least one electro-acoustic output transducer of said headphone; and
    recording a signal from said at least one electro-acoustic output transducer of said headphone using said audio processing integrated circuit of said client terminal.

11. A computer readable storage medium comprising computer executable instructions that, when executed by one or more processors, cause performance of operations, including:
    a client terminal automatically instructing that an audio processing integrated circuit of said client terminal switch from:
    (i) having no electrical resistance between an electrical ground of said client terminal and an electrical ground of at least one electro-acoustic output transducer of at least one headphone, to
    (ii) connecting an electrical resistance component between the electrical ground of said client terminal and the electrical ground of the at least one electro-acoustic output transducer of the at least one headphone;
    instructing said audio processing integrated circuit of said client terminal to accept as microphone input a signal from said at least one electro-acoustic output transducer of said at least one headphone; and
    recording a signal from said at least one electro-acoustic output transducer of said at least one headphone using said audio processing integrated circuit of said client terminal.

12. A client terminal system for recording from a headphone, comprising:
    at least one headphone interface for connecting to at least one headphone with at least one electro-acoustic output transducer used to record an audio signal;
    at least one audio processing integrated circuit for receiving a plurality of adapting instructions; and
    at least one processing unit, said processing unit configured for:
    automatically adapting said at least one audio processing integrated circuit to switch from:

(i) having no electrical resistance between a conductor of said at least one audio processing integrated circuit and said at least one headphone interface, to
(ii) connecting an electrical resistance component between the conductor of said at least one audio processing integrated circuit and said at least one headphone interface;

adapting said at least one audio processing integrated circuit to record a signal from said at least one headphone interface; and recording said signal from said at least one headphone interface.

13. The client terminal system of claim 12, wherein said client terminal system is any from the list of a smartphone, a mobile phone, a palmtop computer, a laptop computer, a tablet computer, a notebook computer, a personal computer, a music player, a video player, and Bluetooth earphones.

14. The client terminal system of claim 12, wherein said at least one headphone is any from the list of a headphone, an earpiece, an earspeaker, a headphone, a headset, a stereo headset, a mono-aural headset, a stereo headphone, a mono-aural headphone, a stereo earphone, a mono-aural earphone, an internal speaker, and an external speaker.

15. The client terminal system of claim 12, wherein said at least one electro-acoustic output transducer is at least one loudspeaker used for playing audio signals of said at least one headphone.

16. The client terminal system of claim 12, wherein said at least one processing unit is configured for adapting said at least one audio processing integrated circuit to simultaneously record said signal and play back a target audio signal, and automatically subtract the target audio signal from said signal to produce an aural noise signal.

* * * * *